United States Patent
Saalfeld et al.

(10) Patent No.: US 12,316,673 B1
(45) Date of Patent: May 27, 2025

(54) FLEET-MIGRATION BASED NETWORK COMPATIBILITY ANALYSIS

(71) Applicant: Amazon Technologies, Inc., Seattle, WA (US)

(72) Inventors: Christoph Saalfeld, Seattle, WA (US); Travis Davidson Bybee, Seattle, WA (US); Alexandra Elizabeth Baoboe Lee, Seattle, WA (US); Eeshan Shreeram Thakar, Seattle, WA (US); Artem Zhurid, Bellevue, WA (US); Shijia Yang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 196 days.

(21) Appl. No.: 18/067,601

(22) Filed: Dec. 16, 2022

(51) Int. Cl.
*H04L 9/40* (2022.01)
*H04L 67/1036* (2022.01)

(52) U.S. Cl.
CPC ........ *H04L 63/166* (2013.01); *H04L 67/1036* (2013.01)

(58) Field of Classification Search
None
See application file for complete search history.

(56) References Cited

U.S. PATENT DOCUMENTS

| | | | |
|---|---|---|---|
| 2006/0218265 A1* | 9/2006 | Farber | H04L 61/4511 709/223 |
| 2018/0191867 A1* | 7/2018 | Siebel | H04L 67/53 |
| 2020/0125535 A1* | 4/2020 | Strauss | G06F 3/0613 |
| 2021/0243250 A1* | 8/2021 | Agarwal | H04L 41/0893 |
| 2022/0052993 A1* | 2/2022 | Zhuravlev | H04L 67/141 |
| 2023/0396648 A1* | 12/2023 | St. Pierre | H04L 63/1425 |

* cited by examiner

*Primary Examiner* — Raqiul A Choudhury
(74) *Attorney, Agent, or Firm* — Knobbe, Martens, Olson & Bear, LLP (57) ABSTRACT

A fleet-based migration system is described that can obtain requests to initiate network connections from individual client devices and divide the requests among one or more sets of endpoints with differing configurations. The endpoints initiate connection attempts based on the requests and capture data regarding the connection attempts. Using the captured data, the system can determine incompatibilities between client devices and fleet configurations and inform users of the incompatibility.

21 Claims, 5 Drawing Sheets

FLEET-MIGRATION BASED NETWORK COMPATIBILITY ANALYSIS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Data centers may hold data to support the use of client devices created by service providers.

Malicious entities occasionally try to gain access to data being transferred over a network, such as by eavesdropping on network communications. To prevent such eavesdropping, secure communication protocols have been developed that encrypt network communications, such that an eavesdropper cannot gain access to exchanged information. One example of such a secure communication protocol is the Transport Layer Security (TLS) protocol, a successor to the earlier Secure Sockets Layer (SSL) protocol. Initiation of a secure communication channel via a secure communication protocol typically requires an initialization-often referred to as a handshake-between parties to the channel. Failure to properly conduct a handshake often results in failure to create a secure communication channel. Moreover, because devices are often configured not to allow for non-secure communication, such failure can result in a failure to communicate via a network.

DETAILED DESCRIPTION

Generally described, aspects of the present disclosure relate to identifying incompatibilities between client devices and endpoints of a cloud provider system with specific endpoint configurations, such as different implementations of a secure communication protocol. Some client devices can be specifically configured to connect with one endpoint configuration, such as a particular implementation or version of a secure communication protocol and, if an update or a change is made to an endpoint configuration, the client devices may be unable to creation a secure connection to endpoints having that configuration. In extreme cases, such as where a client device relies on a secure connection to an endpoint and is unable to be reconfigured, this issue can render the client computing device unusable. The present disclosure addresses this problem by providing for fleet-migration based network compatibility analysis. Specifically, the present disclosure provides for tracking how client devices connect to network endpoints as a configuration of such endpoints changes and comparing connection information between multiple endpoint configurations to programmatically detect when client devices are unable to connect to a particular endpoint configuration. Moreover, embodiments of the present disclosure can address incompatibilities between individual client devices and particular endpoint configurations by migrating client devices to a known-compatible endpoint configuration when an incompatibility with another configuration is detected. In some instances, the known-compatible endpoint configuration may include application of additional monitoring or data collection on the client devices, such as a root cause of the incompatibility can be better determined.

One example where incompatibilities often arise is with respect to Internet-of-Things (IoT) devices. Generally described, IoT devices are network-connected devices with a primary function other than general purpose computation. For example, IoT devices can include network-connected human-interface or virtual assistant devices ("smart speakers"), network-connected home appliances, network-connected home fixtures (e.g., lights, switches, etc.), or the like. Often, IoT devices have limited computational resources (e.g., limited memory, processing power, etc.), a limited ability to obtain or implement new software or firmware, or a combination thereof. This can result in limited ability to handle configuration changes in network endpoints to which the IoT devices connect. For example, if an endpoint changes its implementation of a secure communication protocol, an IoT device may be unable to complete the expected protocol handshake to the endpoint. In some instances, such failure is not reported to the endpoint-rather, the IoT device simply does not connect to the endpoint. Accordingly, it can be difficult to diagnose such incompatibilities at the endpoint, or to (for example) distinguish failures due to incompatibilities from failures due to transient network issues. Moreover, IoT devices often rely on particular endpoint's various functions such that failure to connect to an endpoint reduces functionality of the IoT device, sometimes rendering it useless.

The present disclosure provides for fleet-migration based network compatibility analysis that enables network providers with the ability to detect incompatibilities between devices and endpoints by migrating devices between endpoints of different configurations and noticing when devices are unable to connect to one or more endpoints, determining which client devices will be unable to switch to an alternative security protocol, and programmatically migrating incompatible devices to endpoints with a configuration detected to be compatible with the devices. In some embodiments, when client devices attempt to connect to a network, a cloud computing system is configured to route the client devices to a set of endpoints to which client devices attempt to connect. The cloud computing system can direct the client devices to different subsets of endpoints within the set of endpoints (each subset of which may be generally referred to herein as a different "endpoint fleet"), such that connections of client devices at each endpoint fleet can be analyzed to detect incompatibilities. Each endpoint fleet can implement a different version of the network security protocol. As used herein, the term "version" refers to a specific implementation. Accordingly, different versions refer to different implementations, including implementations of different version numbers (e.g., TLS 1.2 versus 1.3), different variations (e.g., zero, one, or two round-trip-time variations) even if of the same version number, or different software implementations (e.g., using different libraries) even if implementing the same variation and version number. For instance, one endpoint fleet may implement an existing security protocol and another endpoint fleet can implement that security protocol as modified via changes or updates. Using the data collected from connection attempts by the client devices to the different endpoint fleets, the cloud computing system can determine which endpoint fleets from the set of endpoints the client devices should be routed to in the future, such that the client devices are routed to endpoint fleets with which they can connect.

The cloud computing system, for example, can determine which endpoint fleets client devices can connect to by selectively routing client devices to different endpoint fleets and analyzing the connection process (or results of such process) to detect incompatibilities. In such embodiments, the cloud computing system can include a incompatibility detection system which makes the determination on how client devices will be routed to what endpoint fleets. The incompatibility detection system can communicate the determinations to a load balancer which can then direct the client devices to the endpoint fleets according to those determinations. For example, the incompatibility detection system can set a ratio for the load balancer which determines what portion of client device requests will be routed to one endpoint fleet and what portion of client device requests will be routed to another endpoint fleet. The load balancer can use the ratio to route incoming requests to connect from client devices and can direct the requests to the endpoint fleets based on the ratio.

Each endpoint fleet can illustratively include endpoints that have a fleet-specific configuration differing from the fleet-specific configuration of endpoints in different endpoint fleets. For example, endpoints in each endpoint fleet may implement different versions of a cryptographic or security protocol, or different cryptographic or security protocols. Each endpoint can further be configured to log data regarding attempts by client devices to connect to the endpoint via such protocol. During the connection process, endpoints can gather data about the connection process and store it in a data storage of the cloud computing system. For example, data can include whether the connection succeeded or failed, and if it failed, at what point in the process the failure occurred. Other data could include the type of client device, a manufacturer of the client device, and situational data such as time or location of the connection attempt.

The cloud computing system can then analyze logged data from endpoints of different endpoint fleets to determine incompatibilities between certain client devices and endpoint configurations implemented by one or more endpoint fleets. For example, the incompatibility detection system may compare connection results (e.g., indicating success or failure of a connection attempt by a client device) between two different endpoints fleets to detect that a particular type or class of client device is unable (or less able) to initiate secure connection with a given endpoint fleet, indicating that the device may be incompatible with a configuration of endpoints within that endpoint fleet. A class of client devices can be client devices that are similar with respect to one or more attributes or parameters presented to the cloud computing system, such as devices associated with a particular account on the cloud computing system, devices of a certain make or model, devices that perform similar functions, devices that are attempting to access a certain type of data, etc. For example, client devices may present attributes or parameters to the cloud computing system within a request to initiate a secure communication session (e.g., a TLS "Client Hello"). These attributes or parameters may be collected to provide a unique or semi-unique "fingerprint" identifying each client device. A class of client devices can then be identified as a set of devices with a sufficiently similar or identical fingerprint. Illustratively, where a given class of client device completes secure connections to a first endpoint fleet with a relatively high success rate (e.g., over 90%) and completes secure connections to a second endpoint fleet with a relatively low success rate (e.g., under 50%), the incompatibility detection system can determine that the class of client device has some incompatibility (full or partial) with a configuration of the second endpoint fleet.

Client devices can fail for a number of reasons not related to an incompatibility. For example, a network connection between a client device and an endpoint can be disrupted, a transitory failure may occur at an endpoint, or the client device may momentarily be unable to maintain the communication for internal reasons. Accordingly, an instance of failure does not necessarily indicate an incompatibility. Rather, an incompatibility may be indicated by a trend of failures. For example, in some embodiments, an incompatibility can be determined if the load balancer directs a certain portion of client device requests to one endpoint fleet and a certain portion of client devices to another endpoint fleet and there is a higher rate of failures with connections attempts with one endpoint fleet than connection attempts with the other endpoint fleet. For example, the cloud computing system can compare the percentage of client devices sent to a first endpoint fleet with the percentage of client devices that successfully connected to that first endpoint fleet to determine a success rate of the client devices to that endpoint. The cloud computing system can compare the success rate of client devices attempting to connect to the first endpoint fleet against the success rate of similarly configured client devices, such as the same type of client device, attempting to connect to a differently configured endpoint fleet to determine if the client devices are more successfully connecting to the first endpoint fleet than the second endpoint fleet (e.g., indicating a potential incompatibility between the client devices and the second endpoint). For example, one endpoint fleet can implement an existing security protocol, whereas another endpoint fleet may be configured with a new security protocol. The cloud computing system can track the percentage of connections made between the endpoint fleet that implements previous versions of security protocols and the percentage made between the client device and the fleet implementing new or updated security protocols. Based on the connection data regarding the successful connections with the endpoint fleet implementing the previous versions of a security protocol, the cloud computing system can determine a baseline connection rate at which the client device can connect to compatible security protocols. Using the baseline connection rate, the system can identify if a client device would be incompatible with a fleet implementing the new security protocol by comparing the baseline connection rate with the connection rate between the client device and the endpoint fleet implementing the new or updated security protocols. A situational failure, or a one-time failure, can be disregarded by the incompatibility detection system as no cause for concern for manufacturers. A trend in failures can suggest that the client device will be unable to connect to the network under the new security protocol and is cause for concern. If a trend in failures is detected, the system can be used to notify the user devices and/or the manufacturers that the client device will be unable to connect to endpoints implementing the new security protocol if it is fully deployed among all endpoint fleets.

In some embodiments, the cloud computing system can be further configured to programmatically migrate devices that would otherwise be incompatible with endpoints or provide manufacturers with the data the cloud computing system collected regarding the connection failures. In some cases, the cloud computing system may be able to detect a trend of failures for the specified client device or manufacturer but be unable to determine the point of failure. In some embodiments, the incompatibility detection system of the cloud computing system can direct a request from a client device that has previously been identified to have a compatibility issue to an endpoint fleet configured as an increased data collection endpoint fleet where more data can be collected on a connection attempt of a security protocol. The data gained from the increased data collection endpoint fleet can be delivered to the data storage and be used as part of the cloud computing systems computations to determine reasons for failure. In some embodiments, the data collected from the endpoint configured as an increased data collection endpoint and/or other endpoints can be used to determine a reason for failure and the manufacturer of the client device can be notified of the failure point and be provided with potential fixes to ensure future connections. In other embodiments, the data gained from the increased data collection endpoint fleet can be provided to a manufacturer such that the manufacturer may be able to better diagnose an incompatibility.

In some embodiments, the incompatibility detection system is configured to modify routing of requests on the cloud computing system in order to generate sufficient data to detect an incompatibility. For example, if the incompatibility detection system determines additional data is required to detect an incompatibility, the incompatibility detection system may alter the routing of subsequent client connection attempts to aid in collecting that data. For example, where insufficient data exists with respect to a given class of client device and a given endpoint configuration, the incompatibility detection system may direct the load balancer to route a greater proportion (e.g., all) incoming requests from the given class of client device to an endpoint fleet having the endpoint configuration, such that additional data regarding the given class of client device and the given endpoint configuration is generated. In some embodiments, the incompatibility detection system may attempt to generate additional connection requests from a given class of client device. For example, some client devices are configured maintain a single connection to an endpoint for a long period of time, meaning that little data may exist as to connection attempts by such devices. However, these devices are often configured to automatically reconnect if they become disconnected from the network. Accordingly, the incompatibility detection system may in some embodiments instruct endpoints to force-disconnect a given class client devices, thus requiring such client devices to make new requests to connect to the network and thereby allowing data collection on the devices. The incompatibility detection system can thus generate additional data used to detect incompatibilities between client devices and endpoint configurations, in accordance with embodiments of the present disclosure.

As will be appreciated by one of skill in the art in light of the present disclosure, the embodiments disclosed herein improve the ability of computing systems, such as cloud computing systems, to provide endpoints with configurations compatible with client computing devices. Moreover, the presently disclosed embodiments address technical problems inherent within computing systems; specifically, the difficulty of updating endpoint configurations (such as implementing new cryptographic protocols to protect data stored within a network) while maintaining compatibility with client computing devices. These technical problems are addressed by the various technical solutions described herein, including an incompatibility detection system that may compare connection results between two different endpoints fleets and client devices to determine if client devices are incompatible with configurations implemented by endpoint fleets. Thus, the present disclosure represents an improvement in cloud computing systems and computing systems in general.

The foregoing aspects and many of the attendant advantages of the present disclosure will become more readily appreciated as the same become better understood by reference to the following, when taken in conjunction with the accompanying drawings.

Figure 1:
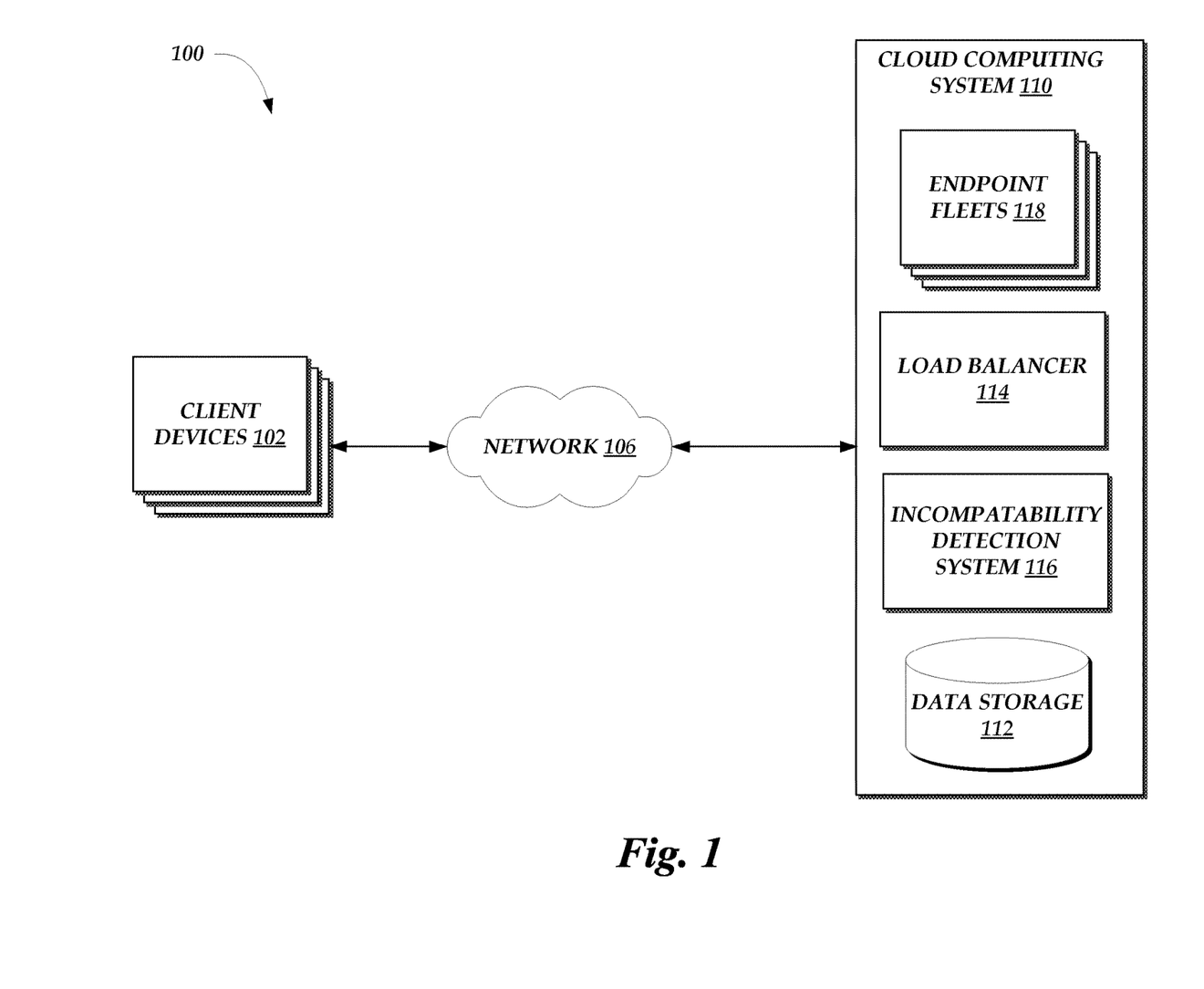
FIG. 1 is a block diagram depicting an illustrative logical network including a cloud computing system that can identify incompatibilities in creating secure network connections between client devices and endpoints by analysis of traffic across multiple endpoint fleets.

FIG. 1 depicts one example of a logical environment 100 in which a cloud computing system 110 can detect incompatibilities between client devices 102 and endpoints 118 using fleet-migration based network compatibility analysis. Endpoints 118 within the cloud computing system 110 may provide network-based functionality used or relied on by client devices 102. For example, client devices 102 may be IoT devices that rely on communication with endpoints 118 over a network 106 to provide network-based functionality to end users. To ensure secure communication over the network 106, endpoints 118 can require that a secure communication channel (such as a transport layer security, or TLS, connection) be established prior to receiving or transmitting other data. However, changes in a configuration of endpoints 118 may result in incompatibility with client devices 102, rendering such devices 102 unable to establish a secure connection to endpoints 118. As described herein, the cloud computing system 110 can thus be configured to route requests to establish connections from client devices 102 to different fleets of endpoints 118, to analyze data regarding of such connections to detect incompatibilities between types or classes of client devices 102 and specific configurations of endpoints 118, and to notify a provider of such types or classes of client devices 102 of the detected incompatibility. Moreover, the cloud computing system 110 can in some instances re-route classes or types of client devices 102 with a detected incompatibility to a known-compatible fleet.

Client devices 102 can, for example, be devices with network access with a different primary function, i.e. Internet of Things (IoT) devices. IoT devices may need to access endpoints 118 to function properly or to update their systems. For example, an IoT could be a smart grill that requires network access in order to retrieve instructions how to maintain temperature or report updates to remote devices to update a user on the grill. Additionally, the IoT functionality may require system updates that only be implemented through a connection to an endpoint 118. In these examples, the IoT device must connect to an endpoint 118 to provide its functionality, and the endpoint 118 may require that the IoT device communicate securely with the endpoint 118. Accordingly, incompatibility between the IoT device and certain endpoints 118 may detrimentally reduce or eliminate functionality of the IoT device.

While an IoT device is provided as one example, client devices 102 may include any number of different computing devices capable of communicating with the cloud computing system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like.

The cloud computing system 110 can be accessed by client devices 102 over a network 106. A cloud computing system 110 (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud computing system 110 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud computing system 110 includes multiple endpoint fleets 118. Each endpoint fleet 118 illustratively includes one or more endpoints implemented in the cloud computing system 110 (e.g., as a virtual machine instance) and configured to provide functionality to client devices 102. In FIG. 1, endpoints within each endpoint fleet 118 are similarly or identically configured, while endpoints between fleets 118 are differently configured. These different configurations may in some cases result in incompatibilities with client devices 102. For example, changes in how a cryptographical protocol is implemented across different endpoint fleets 118 may result in inability of some client devices 102 to connect to one endpoint fleet 118 (e.g., implementing a particular version of the protocol), while remaining able to connect to another endpoint fleet 118.

Endpoints of each endpoint fleet 118 can be configured to log data regarding connections or connection attempts by client devices to data storage 112, which represents any persistent or substantially persistent storage (e.g., a hard disk drive, solid state drive, network-attached storage, a cloud-based object or block storage system, etc.). For example, each endpoint within a fleet 118 may log each connection request from a client device 102, a time of the request, a stage reached with respect to that request (e.g., a particular stage reached of a multi-stage protocol implemented in the request), and an indication of whether the request resulted in a successful connection. Each endpoint can further be configured to log data regarding a client device 102 making the request, such as an account on the cloud computing system 110 associated with the request, a network address of the device 102, a make or model of the device 102, parameters provided by the device 102, or the like.

To divide load between endpoint fleets 118, the cloud computing system includes a load balancer 114 configured to divide requests from client devices among the endpoint fleets 118 according to routing instructions. For example, the load balancer 114 may be configured to direct client requests from client devices 102 all to one of the endpoint fleets 118 to send a portion of the request from client devices 102 to one endpoint fleet 118 and other portions of the requests from client devices 102 to one or more other endpoint fleets 118.

In some embodiments, the load balancer 114 implements domain name system (DNS) load balancing. For example, the load balancer 114 may be implemented as part of a DNS resolver that accepts requests to resolve a domain name associated with the endpoint fleets 118 into one or more internet protocol (IP) addresses, and which selective returns IP addresses of different fleets 118 in order to divide subsequent requests from client devices (e.g., to the IP addresses within DNS responses) among the fleets 118. In other embodiments, the load balancer 114 is an IP load balancer. For example, the load balancer 114 may be associated with a public-facing IP address of the endpoint fleets 118, accept requests to connect to the endpoint fleets 118, and divide the requests among different fleets 118 by routing the requests to different fleets 118.

In some embodiments, endpoints within endpoint fleets 118 are configured to communicate with client devices 102 via secure network connections, such as connections created using the Transport Layer Security (TLS) or Secure Sockets Layer (SSL) protocols. In some instances, failure of a client device 102 to initiate such a secure connection does not result in an explicit error at an endpoint. Rather, if a client device 102 and endpoint fail to negotiate a connection, the client device 102 may "fail silently," simply ceasing to communicate with the endpoint or retrying the connection. In the instance that failure is due to an incompatibility between the client device 102 and a particular endpoint configuration, this process can result in repeated failures of the device 102 to connect to an endpoint, potentially impacting functionality of the client device 102. Moreover, due to the presence of the load balancer 114, such incompatibilities may be difficult to detect. For example, a client device 102 that is incompatible with one endpoint fleet 118 may fail to connect to an endpoint of that fleet 118 and, on retrying the connection, be directed by the load balancer 114 to an endpoint of another fleet 118 having a different configuration. The client device 102 may be compatible with that different configuration, resulting in a successful connection.

While this can enable the client device 102 to operate, it can also result in intermittent failure of the client device 102 to connect to an endpoint that is difficult to diagnose from both the point of view of the client device 102 (because the failure may appear random) and of the cloud computing system 110 (because the failures do not result in errors at the endpoint fleets 118). This intermittent failure can be frustrating to users of client devices 102. Moreover, because the failures are not attributed to incompatibilities with specific endpoint configurations, these configurations (e.g., representing a new version of a protocol) may be more widely implemented among fleets 118, causing more frequent or widespread failures.

To address this problem, the cloud computing system 110 includes an incompatibility detection system 116 configured to analyze the data stored in data storage 112 regarding connection attempts made by client devices 102 to endpoint fleets 118. Using the data, the incompatibility detection system 116 can determine if particular types or classes of client devices 102 are likely incompatible with configurations of certain endpoint fleets 118. Client devices 102 may be grouped into classes based on identifying information, or fingerprints, collected as data as part of the connection attempts. For example, the incompatibility detection system 116 may inspect the data storage 112 to determine, for a given class of client device 102, a success rate for connection attempts to each endpoint fleet 118 (e.g., as a proportion of all requests to a fleet 118 from devices 102 of the given class that result in successful connection). Where two fleets 118 differ in their respective success rates by more than a threshold amount, the incompatibility detection system 116 can determine that such client devices 102 are likely either partly or wholly incompatible with the endpoint fleet 118 having the lower success rate. The data storage 112 can further store information regarding a configuration of each endpoint fleet 118, such that the incompatibility detection system 116 can attribute the incompatibility to a difference in configuration between endpoint fleets 118. For example, where a fleet 118 implementing a first version of a cryptographic protocol has a relatively high success rate and a fleet 118 implementing a second version of the cryptographic protocol has a relatively low success rate (and where configurations of the respective fleets 118 are otherwise the same), the incompatibility detection system 116 can determine that the client devices 102 are likely incompatible with the second version of the protocol.

If an incompatibility detection system 116 determines that one or more client devices 102 is incompatible with a security protocol, the incompatibility detection system 116 can be configured to notify a user or the manufacturer of the incompatible client device 102 of the incompatibility. In addition, the incompatibility detection system 116 can be configured to modify routing of the load balancer 114 to mitigate the incompatibility, such as by directing the load balancer 114 to send the requests from client devices 102 that are incompatible with one endpoint configuration to endpoint fleets 118 of a known compatible configuration. In some embodiments, the incompatibility detection system 116 is configured to aid debugging of client devices 102 with known incompatibilities by sending requests from such client devices 102 to an endpoint fleet 118 configured to conduct additional logging with respect to connection attempts from such client devices 102.

In some embodiments, the information in the data storage 112 may be insufficient to detect incompatibility of a given client device 102 with a given endpoint fleet 118. For example, the data may lack a statistically significant number of connection attempts by one class of client device 102 to one endpoint fleet 118, or analysis by the incompatibility detection system 116 may indicate a possible (but not confirmed) incompatibility, such as by detecting a drop in success rate for a certain endpoint configuration that meets a first threshold (for possible incompatibility) but not a second threshold (for detected incompatibility). In such instances, the incompatibility detection system 116 may be configured to collect more data to aid in analysis. For example, the incompatibility detection system 116 may be configured to modify routing by the load balancer 114 to redirect a higher proportion of subsequent connection requests by the client devices 102 to a given endpoint fleet 118, in order to generate more data regarding the client devices 102 and that endpoint fleet 118. In some embodiments, the incompatibility detection system 116 may be configured to force all endpoint fleets to disconnect currently connected client devices 102. Client devices 102 are often configured to attempt to reconnect to a network each time they disconnect. By force-disconnecting currently connecting client devices 102, the cloud computing system 110 can cause an influx of requests to connect to the cloud computing system 110, resulting in additional data generated by endpoint fleets 118 and thus additional data for the incompatibility detection system 116 to analyze for incompatibility.

Figure 2:
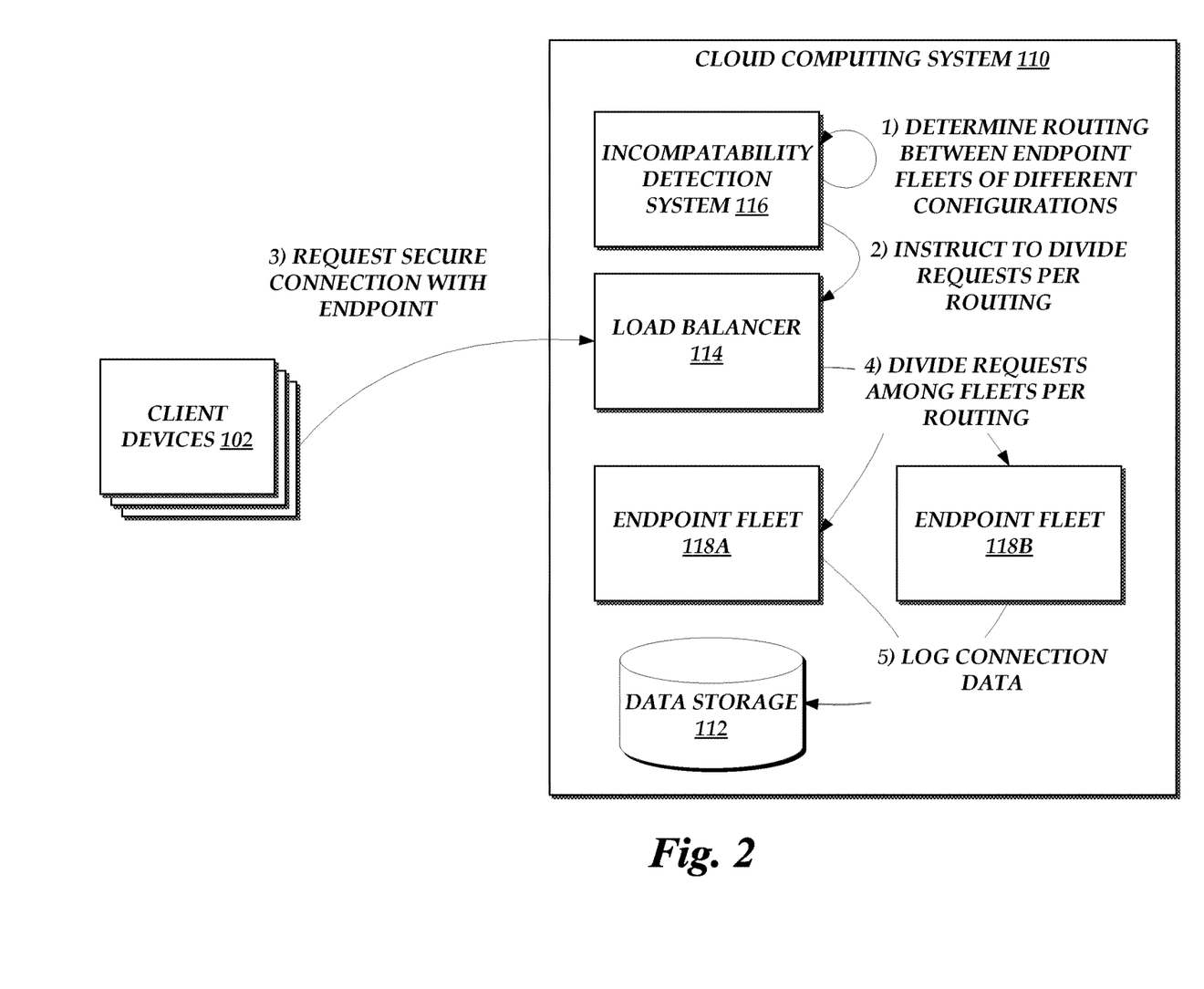
FIG. 2 depicts illustrative interactions for dividing secure connection requests received at the cloud computing system of FIG. 1 among different endpoint fleets to collect data on client device interaction with the endpoint fleets.

FIG. 2 depicts illustrative interactions for dividing secure connection requests received at the cloud computing system of FIG. 1 among different endpoint fleets 118A-B to collect data on client device interaction with the endpoint fleets 118A-B. Each endpoint fleet 118 of FIG. 2 can included endpoints having a different configuration from those of other fleets 118. For example, endpoint fleet 118A may implement one version of a cryptographic protocol and endpoint fleet 118B may implement a different version of the cryptographic protocol. In one example, the different version of the cryptographic protocol may be an updated, and potentially more secure, version of the protocol. Thus, it may be desirable to alter all endpoint fleets 118 of the cloud computing system 110 to implement the updated version of the protocol. However, immediately altering all endpoints in this matter may result in incompatibilities that cause client devices 102 to be unable to connect to the cloud computing system 110. Accordingly, the system 110 may include different endpoint fleets 118 with different configurations, and utilize embodiments of the present disclosure to detect such incompatibilities.

The interactions of FIG. 2 begin at (1), where the incompatibility detection system 116 determines a routing between endpoint fleets 118A and 118B. In one embodiment, the routing specifies a division between endpoints 118A-B as a ratio, such as dividing requests to send a given proportion to endpoint fleet 118A and a remainder to endpoint fleet 118B. In some embodiments, the incompatibility detection system 116 may determine the load balancer 114 should relay the majority of requests from client devices 102 to endpoint fleet A 118A such that only a few requests are sent to endpoint fleet 118B. For example, endpoint fleet 118B may implement a new version of a protocol that has unknown compatibility with client devices 102, and thus the routing may only submit a small proportion of requests to fleet 118B to minimize disruptions that may result from such incompatibility. Illustratively, client devices 102 may be configured to attempt to connect to the cloud computing system 110 multiple times until a connection is successfully achieved, and at each of the multiple times may be routed according to the ratio. Thus, the proportion may be selected such that a client device 102 has a low probability of being continuously routed to an endpoint fleet 118 with unknown compatibility. For example, where client devices 102 are configured to retry a connection n times, the proportion p routed to a given endpoint fleet 118 (e.g., fleet 118B) may be set such that n*p is less than a threshold amount (e.g., 1 percent, $1/10^{th}$ of a percent, etc. In some embodiments, the routing may be time-dependent, and thus vary over time (e.g., over the course of a day). For example, the routing may vary a proportion sent to a given endpoint 118 over the course of a day to capture data regarding client devices 102 that tend to connect at certain times of the day or to avoid disrupting other devices 102 that tend not to connect at those times.

At (2), the incompatibility detection system 116 instructs the load balancer 114 to divide subsequent request from client devices 102 according to the determined routing. Thereafter, at (3), the load balancer 114 receives requests for secure connections from client devices 102. The requests may for example be requests to initiate a TLS-secured connection with the cloud computing system 110.

The load balancer 114, at (4), then divides the requests among the endpoint fleets 118A-B according to the routing determined by the incompatibility detection system 116. In one embodiment, the load balancer 114 implements IP based load balancing, and thus directly receives requests from client devices 102 and routes the requests to endpoint fleets 118 in accordance with the routing. In another embodiment, the load balancer implements DNS-based load balancing. For example, the load balancer 114 may be a DNS resolver that accepts requests from client devices 102 (or DNS servers acting on behalf of client devices 102) to resolve a domain name of the cloud computing system 110 into an IP address, and that returns IP addresses of endpoint fleets 118 in accordance with the routing (e.g., providing IP address of a given fleet 118 in n percent of responses, according to a percentage of requests intended for the fleet 118 in the routing). When implementing DNS-based load balancing, the interactions of FIG. 2 may represent a simplified view of interactions, and FIG. 2 may in practice include additional interactions (e.g., responses from the load balancer 114 to the client device 102 or an intermediate DNS server and connection attempts from client devices 102 to the fleets 118).

In some instances, the load balancer 114 may divide requests according to additional or alternative criteria. For example, the load balancer 114 may be configured to monitor load on endpoint fleets 118 and to modify a division of requests such that a given fleet 118 is not overloaded. In some instances, the load balancer 114 operates to direct individual connection requests to individual endpoints within a fleet 118. In other instances, the load balancer 114 operates to direct connection requests to a fleet 118 generally, which may include an additional load balancer to direct the request to an individual endpoint.

Thereafter, at (5), the endpoint fleets 118 log connection data regarding the requests from client devices 102 into the data storage 112. Illustratively, the log data may be generated by operation of a server software included in an endpoint 118. The log data can include any variety of information for each connection request, such as parameters or values provided by client devices 102 (e.g., content of a connection request, such as a make, model, or configuration of the client device 102, protocols supported by the client device 102, authentication information of the client device 102 that associates the request to an account on the cloud computing system 110, etc.), parameters or values provided by the endpoint fleet 118 in response (e.g., content of a response provided to a client device 102 party to the request), or other parameters stored at the fleet 118 (e.g., a current time, current configuration data of the fleet 118, etc.). The log data can further provide state information of the request, such as a final state reached in connection with the request. For example, where the connection request initiates a multi-stage cryptographic security protocol, the log data may reflect which stages (or a final stage) reached in connection with a request. Accordingly, log data may reflect whether each request succeeded in creating a connection or failed to do so. As noted above, the cloud computing system 110 can then be configured to analyze the log data in order to detect incompatibilities between client devices 102 and endpoint fleets 118.

Figure 3:
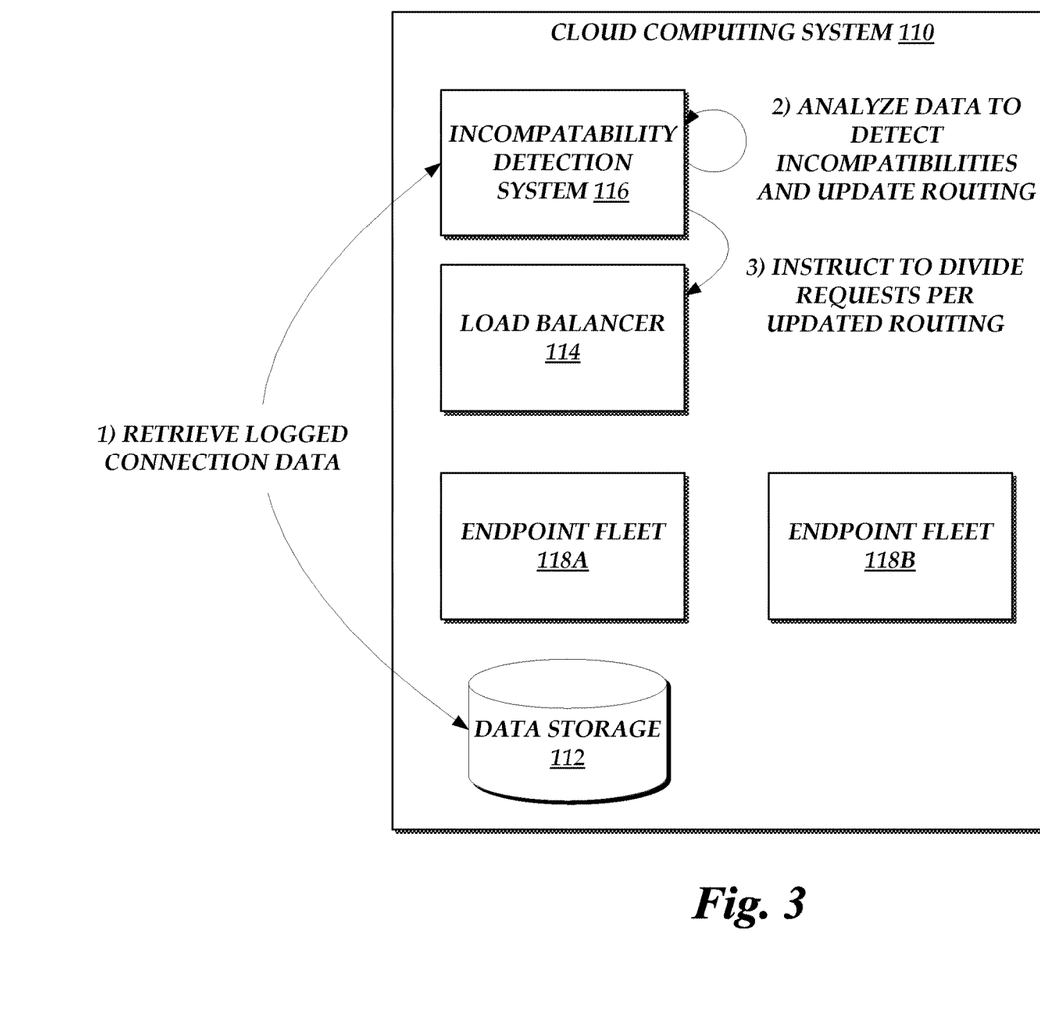
FIG. 3 depicts illustrative interactions for analyzing log data regarding client device interaction with endpoint fleets of the cloud computing system of FIG. 1 to detect incompatibilities between individual classes of client devices and specific configurations of endpoints and to update routing on the cloud computing system based on the analysis.

FIG. 3 depicts illustrative interactions for analyzing log data regarding client device 102 interaction with endpoint fleets 118 of the cloud computing system 110 to detect incompatibilities between individual classes of client devices 102 and specific configurations of endpoints within a fleet 118 and to update routing on the cloud computing system 110 based on the analysis. As noted above, incompatibilities can occur due to a specific configuration of endpoints, which configurations vary across endpoint fleets 118. Thus, by analyzing log data from different endpoint fleets 118 having different configurations, the incompatibility detection system 116 can identify incompatibilities between one or more client devices 102 (as reflected in the log data) and specific fleets 118 having given configurations.

Accordingly, at (1), the incompatibility detection system 116 retrieves logged connection data from the data storage 112. The logged connection data may be generated, for example, via the interactions of FIG. 2, discussed above. As noted therein, the data may include, for each connection attempt by a client device 102, one or more of parameters or values provided by the client device 102 requesting to connect to the cloud computing system 110, parameters or values provided by the endpoint fleet 118 in response, other parameters stored at the fleet 118 regarding the attempt, and state information of the attempt (such as an indication of whether the attempt succeeded or failed, a final state reached by the attempt, etc.).

Thereafter, at (2), the incompatibility detect system 116 analyzes the retrieved data to detect incompatibilities between one or more client devices 102 and one or more endpoint fleets 118. Generally described, the analysis can include comparing connection data of two endpoint fleets 118 (e.g., fleets 118A and 118B) to identify one or more client devices 102 that successfully created a network connection to one endpoint fleet 118 but not to the other endpoint fleet 118. Because endpoint fleets 118 act as endpoints to the cloud computing system 110 and vary in configuration, this can reflect that the one or more client devices 102 successfully created a network connection to the cloud computing system 110 under one endpoint configuration (that of the fleet 118 to which the devices 102 connected) but not under another configuration (that of the fleet 118 to which the devices 102 did not connect). In one embodiment, the analysis is based at least partly on a successful connection rate reflected in data of each fleet 118, which rate can reflect successful connection attempts as a proportion (e.g., a percentage) of all connection attempts at a fleet 118. For example, when the successful connection rate at one fleet 118 differs from the successful connection rate at another fleet 118 by more than a threshold (e.g., preconfigured) amount, the incompatibility detection system 116 may detect an incompatibility of client devices 102 with the fleet 118 having the lower successful connection rate.

In one embodiment, analysis occurs with respect to all log data of at least two fleets 118. In another embodiment, the incompatibility detection system 116 conducts analysis with respect to a subset of log data of at least two fleets 118, such as log data corresponding to a particular account on the cloud computing system 110 or log data reflecting connection attempts by a certain class of device 102 (e.g., as defined by a make, model, configuration, etc. of devices 102). Illustratively, analyzing connection data with respect to certain accounts or classes of devices 102 may assist in isolating incompatibilities that are particular to devices 102 of such accounts or such classes of devices 102.

In some instances, the incompatibility detection system 116 can determine that the data is insufficient to detect an incompatibility. For example, the number of connections reflected in log data with respect to a set of devices 102 and a given endpoint configuration may not be sufficient to accurately detect a potential incompatibility between the devices 102 and the configuration. In one embodiment, the incompatibility detection system 116 is configured to require at least a threshold number of connection records between devices 102 and an endpoint configuration in order to flag an incompatibility between the devices 102 and the configuration. In another embodiment, the incompatibility detection system 116 is configured to vary a required number of connections based on a difference in the successful connection rate between endpoint fleets 118 having different configurations. Illustratively, where the number of connections used to calculate each successful connection rate is very high, the incompatibility detection system 116 may detect an incompatibility based on a relatively low difference in the successful connection rate, as such difference may be statistically significant for the number of connections analyzed. Conversely, where the number of connections used to calculate each successful connection rate is very low, the incompatibility detection system 116 may decline to indicate an incompatibility based on a relatively high difference in the successful connection rate, as the difference may be statistically insignificant given the number of connections analyzed. In one embodiment, when a successful connection rate difference between two endpoint fleets 118 by at least a threshold amount, but the number of connections used to calculate the difference does not verify statistical significance of the difference, the incompatibility detection system 116 is configured to detect that the data insufficient to detect an incompatibility. As noted below, the incompatibility detection system 116 can then be configured to cause further data to be generated.

In addition, at (2), the incompatibility detection system 116 updates a routing between endpoint fleets 118A-B based on the results of the analysis. For example, where the analysis indicates that insufficient data exists to detect an incompatibility, the incompatibility detection system 116 can update the data to generate required additional data. Illustratively, assume that a prior routing directed 99% of connections (e.g., for a given set of devices 102) to endpoint fleet 118A and 1% of connections to endpoint fleet 118B. In this example, assuming a sufficiently large total number of connection requests, connection data for fleet 118A may be statistically significant. However, connection data for fleet 118B may not be statistically significant, given the low proportion of requests routed to fleet 118B. The incompatibility detection system 116 may thus update the routing to direct additional requests to the fleet 118B, thus generate additional data regarding fleet 118B. In some instances, the incompatibility detection system 116 may additionally or alternatively instruct fleets 118 to force-disconnect one or more client devices 102, thus generating additional data regarding such devices 102 when the devices 102 attempt to reconnect.

Where the incompatibility detection system 116 detects an incompatibility between one or more client devices 102 and a given endpoint fleet 118, the incompatibility detection system 116 can update the routing to mitigate the incompatibility. For example, the system 116 may update the routing such that devices 102 associated with a detected incompatibility are routed away from a fleet 118 with which they are incompatible (e.g., the fleet 118 with which the devices 102 had a low connection success rate) and toward a fleet 118 with which they are compatible (e.g., the fleet 118 with which the devices 102 had a high connection success rate). In some instances, the cloud computing system 110 may include one or more fleets 118 configured to log additional data regarding connection attempts, and the incompatibility detection system 116 is configured to route devices 102 with detected incompatibilities to such fleets 118. For example, these fleets 118 may have additional software (e.g., packet capture software) or particular software configuration (e.g., high verbosity logging) that facilitates debugging connection incompatibilities, such that routing devices 102 to these fleets 118 generates additional data that can be used to pinpoint a source of incompatibility. The incompatibility detection system 116 may further notify client devices 102 or other parties associated with client devices 102 (e.g., a manufacturer of such devices 102, a user of an account of the devices 102 on the cloud computing system 110, etc.) of the detected incompatibility.

In some embodiments, the incompatibility detection system 116 may be utilized in connection with a transition between endpoint configurations, reflected in two respective fleets 118. For example, a provider of the cloud computing system 110 may desire to deploy a new version of software implementing a particular cryptographic protocol used by endpoints. To avoid issues that might arise if the new version is incompatible with client devices 102, the cloud computing system 110 may be configured to deploy the new version of the software over time. For example, the system 110 may include a first fleet 118 implementing both a prior version of the software and a second fleet 118 the new version of the software. The load balancer 114 may employ a glide path to divide requests among the fleets 118, such that a proportion of requests to second fleet 118 begins at a relatively small number (e.g., 5% or less) and increases over time so long as no incompatibility is detected between client devices 102 and the second fleet 118. Accordingly, where the incompatibility detection system 116 detects no incompatibility based on a connection success rate between the two fleets 118, the incompatibility detection system 116 may configured to instruct the load balancer 114 to proceed with a transition of requests to the second fleet 118 (e.g., by progressing along the glide path). In some embodiments the transition may be implemented as a step function, including temporary high allocations of traffic to a testing fleet (e.g., the second fleet 118). For example, if the incompatibility detection system 116 does not detect an incompatibility, the incompatibility detection system 116 can direct the load balancer 114 to route all client devices 102 that have no detected incompatibilities to the second fleet 118 for a finite period of time. During the finite period of time, the cloud computing system 110 can collect data to determine the stress that would be put on the second fleet 118 if all client device 102 requests are routed to the second fleet 118. The incompatibility detection system 116 can then analyze data of the second fleet 118 in accordance with embodiments of the present disclosure to determine whether client devices 102 may be incompatible with the second fleet 118. If no incompatibility is detected, the incompatibility detection system 116 may instruct the load balancer 114 to continuously route all traffic to the second fleet 118, thus successfully transitioning to the new version of software without impairing interoperability with client devices 102.

Accordingly, the interactions of FIG. 3 enable the cloud computing system 110 to programmatically detect incompatibilities between client devices 102 and endpoint configurations represented by different endpoint fleets 118, to notify parties regarding such incompatibilities, to mitigate the incompatibilities, and to programmatically control operation of the cloud computing system 110 to deploy modified endpoint configurations without unnecessarily disrupting operation of the system 110 due to incompatibilities.

Figure 4:
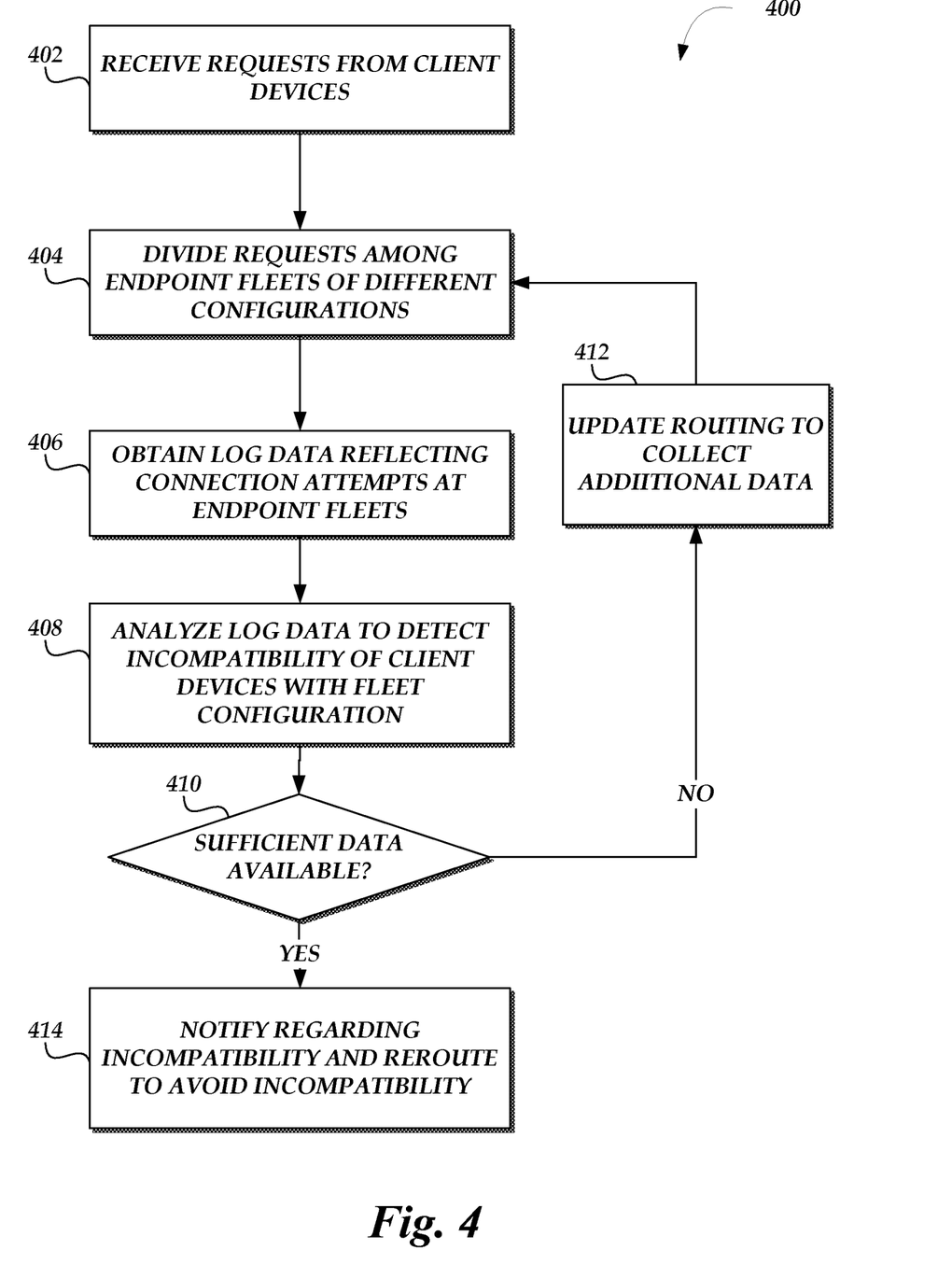
FIG. 4 is a flow chart depicting an illustrative routine for analyzing data regarding client device interaction with endpoint fleets to detect incompatibilities between individual classes of client devices and specific configurations of endpoints.

FIG. 4 depicts one illustrative routine 400 for analyzing data regarding client device 102 interaction with endpoint fleets 118 to detect incompatibilities between individual classes of client devices 102 and specific configurations of endpoints. The routine 400 may be carried out, for example, by the cloud computing system 110 of FIG. 1.

The routine 400 begins at block 402, where the cloud computing system 110 receives requests from client devices 102 to access an endpoint of the cloud computing system 110. For example, each request may attempt to access a uniform resource locator (URL) or IP address associated with the cloud computing system 110, per a configuration of the devices 102. As an illustration, the URL or IP address may point to an endpoint providing network-based functionality to the client devices 102.

The routine continues at block 404 where the cloud computing system 110 divides the requests from the client devices 102 among endpoint fleets 118 of different configurations. For example, a first endpoint fleet 118 may have a known good configuration, while a second endpoint fleet 118 may have a different (e.g., newer configuration) that is not yet known to be compatible with the client devices 102. In one instance, the second endpoint fleet 118 is configured to implement a newer version of a cryptographic secure communications protocol, such as TLS.

In one instance, the cloud computing system 110 divides requests among endpoint fleets using DNS-based routing. For example, the cloud computing system 110 may include a DNS resolver that accepts requests to resolve a domain name associated with endpoint fleets 118 into IP addresses, and that resolves the requests in a manner that implements the division (e.g., by returning one or more IP addresses associated with a first fleet 118 in response to a first percentage of requests and by returning one or more IP addresses associated with a second fleet 118 in response to a second percentage of requests). In another instance, the cloud computing system 110 divides requests among endpoint fleets using IP-based routing. For example, the cloud computing system 110 may include a network device (e.g., an IP-based load balancer) that accepts IP traffic to a network address associated with multiple endpoint fleets 118 and forwards the traffic to a target endpoint fleet 118 in accordance with a pre-configured division.

As discussed above, a division of requests may be predetermined on the cloud computing system 110 by, for example, the incompatibility detection system 116. In one embodiment, the division is selected such that a statistically significant proportion of requests are routed to an endpoint fleet 118 without a known good configuration (e.g., a testing fleet 118). For example, the division may be selected such that the number of total expected requests to the testing fleet 118 exceeds a threshold value. Further, the division may be selected such that if the testing fleet 118 configuration is incompatible with a given device 102, the device 102 is unlikely (e.g., at less than a threshold percentage chance) to be continuously routed to the testing fleet 118 after n attempts. For example, the division may be selected such that there is less than a y chance that a device 102 attempting to connect n times is, in each attempt, routed to the testing fleet 118 (e.g., $m^n < y$, where m is a proportion of requests routed to the testing fleet 118). The division may be fixed among different client devices 102 or vary according to the device 102. For example, the division may vary among authentication information provided by devices 102 (e.g., associating the devices 102 with different accounts on the cloud computing system 110), among device make, model, configuration, etc. In some instances, the division may vary over time—for example, the division may increase for short periods to route additional traffic to a testing fleet 118 before reverting. In this context, "short" may be selected to minimize a duration of perceived "outage" of the cloud computing system 110 by a device 102 should the device 102 be incompatible with the testing fleet 118. For example, a division may increase for a few seconds to a few minutes to provide additional routing to the testing fleet 118 without devices 102 experiencing prolonged incompatibility.

At block 406, the cloud computing system 110 obtains log data reflecting connection attempts at the endpoint fleets 118. For example, each endpoint in an endpoint fleet 118 can be configured to store log data regarding connection attempts by client devices 102. For example, each endpoint within a fleet 118 may log each connection request from a client device 102, a time of the request, a stage reached with respect to that request (e.g., a particular stage reached of a multi-stage protocol implemented in the request), and an indication of whether the request resulted in a successful connection. Each endpoint can further be configured to log data regarding a client device 102 making the request, such as an account on the cloud computing system 110 associated with the request, a network address of the device 102, a make or model of the device 102, parameters provided by the device 102, or the like.

At block 408, the cloud computing system 110 then (e.g., via the incompatibility detection system 116) analyzes the log data to detect incompatibilities of client devices 108 with one or more endpoint fleets 118, and thus with a configuration of that fleet 118. For example, the incompatibility detection system 116 can perform a statistical analysis on the log data to detect that one or more client devices 102 are more likely to connect to one endpoint fleet 118 than another. The statistical analysis can include using the percentage of successes with one class of client device 102 and an endpoint fleet 202 and the class of client devices 102 and a different endpoint fleet 202. Comparing the two rates, the incompatibility detection system can detect if there is a large enough difference between the two rates, such as a difference meeting a pre-defined threshold or threshold based on the number of connections analyzed, that indicates the client devices 102 are incompatible with one of the endpoint fleets 118. In one embodiment, the cloud computing system 110 conducts analysis with respect to a variety of pre-defined "splits" within the data corresponding to different classes of device 102, such as analyzing with respect to each account on the cloud computing system 110, each make of device 102, each model of device 102, etc. Should the successful connection rate vary among fleets 118 with respect to a given split, the cloud computing system 110 can determine that the devices 102 of the split are likely incompatible with the fleet 118 having the lower successful connection rate.

The routine then continues at block 410 wherein the cloud computing system 110 determines whether sufficient data is available to detect incompatibilities. If, for example, the analysis of block 408 fails with respect to one class of device 102 due to insufficient data regarding the class of device 102 and a given endpoint fleet 118, block 410 can evaluate to true, and the routine 400 proceeds to block 412.

At block 412, the cloud computing system 110 updates the routing of requests to collect additional data to address the determined insufficiency. For example, the cloud computing system 110 may increase a proportion of requests from a particular class of client devices 102 that are routed to a particular endpoint fleet 118, thus increasing data with respect to those devices 102 and that fleet 118. In some instances, the cloud computing system 110 may also cause one of more devices 102 to submit requests by "force disconnecting" such devices 102. For example, the cloud computing system 110 may instruct endpoints to halt any existing sessions with one or more devices 102, and the devices 102 may be configured on disconnection to attempt to reconnect to the cloud computing system 110. Accordingly, force disconnection can generate additional requests from the one or more devices 102. The routine 400 then returns to block 404, as discussed above, and proceeds until sufficient data is available at block 410.

When block 410 evaluates as true, the routine 400 proceeds to block 414, where the cloud computing system 110 sends a notification regarding detected compatibilities, if any. Illustratively, the notification may be sent to client devices 102 themselves, to a manufacturer of client devices 102, or the like. The notification can be a push notification, email to the user, or other notification types. The notification can, in some embodiments, include instructions on how to update the client device 102 to ensure connection attempts are successful.

In addition, the cloud computing system 110 at block 414 updates routing of client devices 102 to address the incompatibility. For example, the cloud computing system 110 may modify a division of requests such that subsequent requests from client devices 102 with a detected incompatibility are routed solely to a fleet 118 with a known good configuration (e.g., a fleet 118 with a highest successful connection rate for the devices). As another example, the cloud computing system 110 may modify routing of requests such that subsequent requests from client devices 102 with a detected incompatibility are routed to a fleet 118 configured to implement additional logging with respect to connection requests from such devices 102 (e.g., by configuring software to log with a higher verbosity, by applying packet capture software to such requests, etc.). The additional data generated from such logging may, for example, assist in troubleshooting failed connection attempts from the client devices 102.

While FIG. 4 depicts one example routine 400, variations or modifications are possible. As one example, the ordering of blocks within the routine 400 may vary, for example, with block 410 being implemented prior to block 408. As another example, the routine 400 may also implement functionality when no incompatibility is detected. For example, the cloud computing system 110 may increase a proportion of requests to a testing fleet 118 while no incompatibility is detected. The routine 400 may illustratively be implemented periodically or continuously during such increase to detect incompatibilities that may arise from the increases. Thus, the routine 400 should be understood as illustrative.

Figure 5:
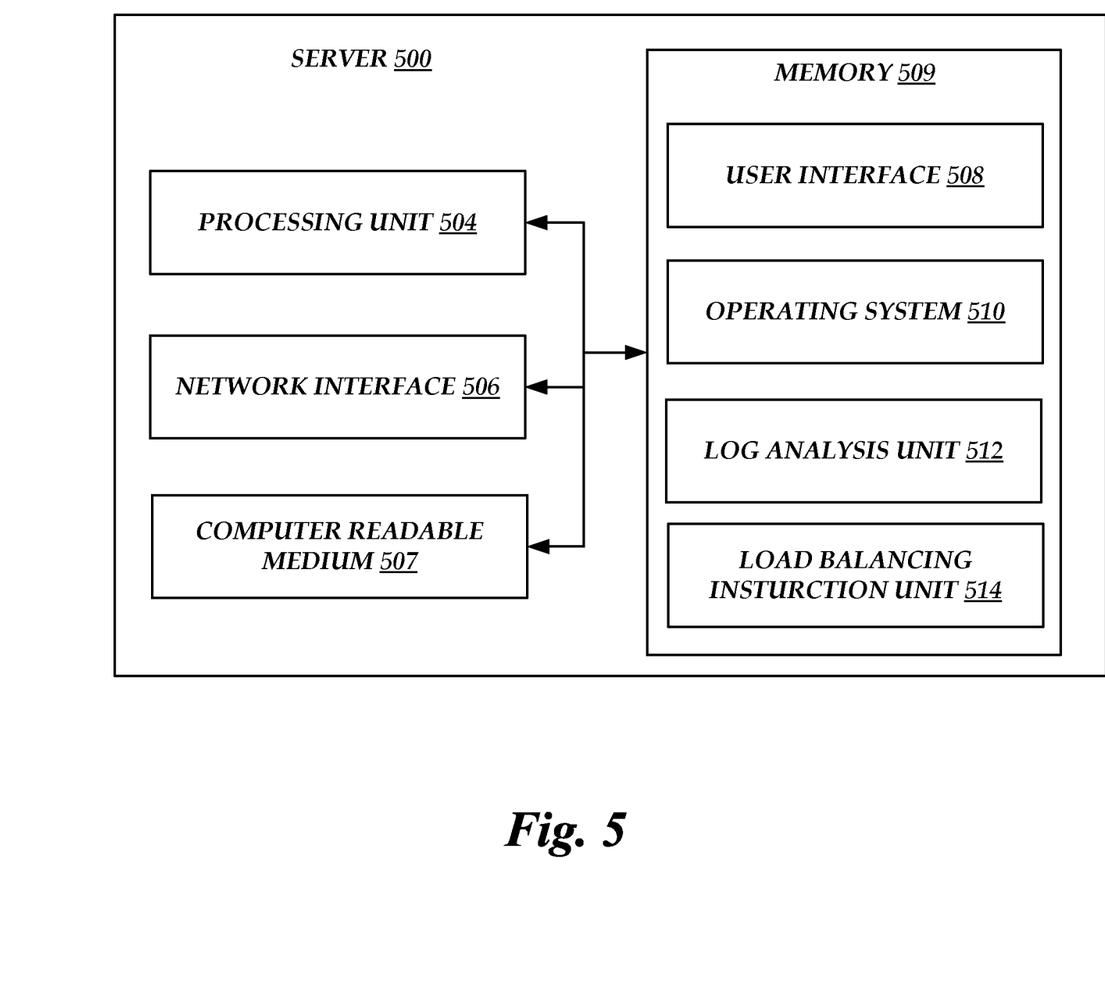
FIG. 5 is a block diagram depicting an illustrative configuration of one embodiment of an incompatibility detection system that can implement embodiments of the present disclosure.

FIG. 5 depicts one embodiment of an architecture of a server 500 that may implement the incompatibility detection system 116 described herein. The general architecture of server 500 depicted in FIG. 5 includes an arrangement of computer hardware and software components that may be used to implement aspects of the present disclosure. As illustrated, the server 500 includes a processing unit 504, a network interface 506, a computer readable medium drive 507, and a memory 509, all of which may communicate with one another by way of a communication bus. The network interface 506 may provide connectivity to one or more networks or computing systems, such as the network 106 of FIG. 1. The processing unit 504 may thus receive information and instructions from other computing systems or services via a network. In some embodiments, the server 500 may include more (or fewer) components than those shown in FIG. 5.

The memory 509 may include computer program instructions that the processing unit 504 executes in order to implement one or more embodiments. The memory 509 generally includes RAM, ROM and/or other persistent or non-transitory memory. The memory 509 may store an operating system 510 that provides computer program instructions for use by the processing unit 504 in the general administration and operation of the server 500. The memory 509 may further include computer program instructions and other information for implementing aspects of the present disclosure. For example, in one embodiment, the memory 509 includes user interface software 508 that generates user interfaces (and/or instructions therefor) for display upon a computing device, e.g., via a navigation interface such as a web browser installed on the computing device. In addition, memory 509 may include or communicate with one or more auxiliary data stores, such as data storage 112.

In addition to the user interface module 508, the memory 509 may include a log analysis unit 512 and a load balancing instruction unit 514 that may be executed by the processing unit 504. In one embodiment, the log analysis unit 512 and the load balancing instruction unit 514 implement various aspects of the present disclosure, e.g., analyzing log data to detect incompatibilities of client devices 102 with endpoint configurations and generating routing instructions that instruct a load balancer to route subsequent request by client devices 102 to endpoints according to the analysis. While the log analysis unit 512 and the load balancing instruction unit 514 are shown in FIG. 5 as part of the server 500, in other embodiments, all or a portion of the software may be implemented by alternative computing devices within the cloud computing system 110, such as virtual computing devices within a hosted computing environment a part of the endpoints 118.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   obtaining, at a computing system, requests to initiate secure network connections with the computing system from individual client devices;
   dividing the requests among at least two sets of endpoints within the computing system, wherein a first set of endpoints, of the at least two sets implements a first version of a cryptographic protocol, and wherein a second set of endpoints, of the at least two sets, implements a second version of the cryptographic protocol;
   at the first set of endpoints:
      receiving a first portion of the requests;
      implementing the first version of the cryptographic protocol with respect to the first portion of the requests; and
      generating first data reflecting whether implementing the first version of the cryptographic protocol with respect to the first portion of the requests resulted in successful secure network connections between the computing system and individual client devices requesting to initiate the secure network connections;
   at the second set of endpoints:
      receiving a second portion of the requests;
      implementing the second version of the cryptographic protocol with respect to the second portion of the requests; and
      generating second data reflecting whether implementing the second version of the cryptographic protocol with respect to the second portion of the requests resulted in successful secure network connections between the computing system and individual client devices requesting to initiate the secure network connections;
   comparing the first data and the second data to identify one or more client devices, of the individual client devices, that successfully created a secure network connection to the computing system using the first version of the cryptographic protocol and that did not successfully create a secure network connection to the computing system using the second version of the cryptographic protocol; and
   output a notification indicating expected incompatibility of the one or more client devices with the second version of the cryptographic protocol.

2. The computer-implemented method of claim 1, wherein comparing the first data and the second data to identify the one or more client devices comprises detecting that a successful connection rate of individual client devices reflected within the first data exceeds a successful connection rate of individual client devices reflected within the second data by at least a threshold amount.

3. The computer-implemented method of claim 1 further comprising redirecting additional requests from the one or more client devices to the first set of endpoints implementing the first version of the cryptographic protocol.

4. The computer-implemented method of claim 1 further including redirecting additional requests from the one or more client devices to a third set of endpoints implementing the first version of the cryptographic protocol and configured to generate third data that includes additional information regarding connection attempts by the one or more client devices relative to the first data and the second data.

5. A system for detecting incompatibility between client devices and endpoint configurations in a hosted computing environment, the system comprising:
   a first set of endpoints configured to accept first connection requests from client devices and implementing a first protocol with respect to the connection requests, wherein the first set of endpoints are further configured to generate first data reflecting whether implementing the first protocol with respect to the first connection requests resulted in successful network connections with individual client devices making the first connection requests;
   a second set of endpoints configured to accept second connection requests from client devices and implementing a second protocol with respect to the connection requests, wherein the second set of endpoints are further configured to generate second data reflecting whether implementing the second protocol with respect to the second connection requests resulted in successful network connections with individual client devices making the second connection requests; and
   one or more processors configured with computer-executable instructions to:
      obtain a set of requests to initiate network connections with the hosted computing environment, individual requests within the set of requests corresponding to individual client devices;

divide the requests among first and second sets of endpoints to result in the first and second connection requests;

compare the first data and the second data to identify one or more client devices, of the individual client devices, that successfully created a network connection to the hosted computing environment using the first protocol and that did not successfully create a network connection to the hosted computing environment using the second protocol; and output a notification indicating expected incompatibility of the one or more client devices with the second protocol.

6. The system of claim 5, wherein the one or more processors are configured to divide the requests among at least two first and second sets of endpoints using domain name system (DNS) load balancing.

7. The system of claim 5, wherein the one or more processors are further configured to detect that the first data contain insufficient data and to modify division of the requests to increase a proportion of subsequent requests that are directed to the first set of endpoints.

8. The system of claim 5, wherein the one or more computing processors are further configured to generate at least one portion of the set of requests by causing at least one of the first and second set off endpoints to disconnect currently connected client devices, wherein the currently connected client devices are configured to transmit the at least one portion of the set of requests responsive to being disconnected.

9. The system of claim 5, wherein the first protocol and second protocol are distinct implementations of a cryptographic protocol.

10. The system of claim 9, wherein the cryptographic protocol is transport security layer (TLS).

11. The system of claim 5, wherein the client devices include Internet-of-Things (IoT) devices.

12. The system of claim 5, wherein comparing the first data and the second data to identify the one or more client devices comprises detecting that a successful connection rate of individual client devices reflected within the first data exceeds a successful connection rate of individual client devices reflected within the second data by at least a threshold amount.

13. One or more non-transitory computer-readable media comprising computer-executable instructions that, when executed by a computing system, cause the computing system to:

obtain, at the computing system, requests to initiate connections with the computing system from individual client devices;

divide the requests among at least two sets of endpoints within the computing system, wherein a first set of endpoints, of the at least two sets implements a first protocol, wherein a second set of endpoints, of the at least two sets, implements a second protocol, and wherein each set of endpoints is further configured to generate data reflecting whether implementing the respective first or second protocol with respect to connection requests received at the set of endpoints resulted in successful network connections with individual client devices making the connection requests;

compare the data of the first set of endpoints with the data of the second set of endpoints to identify one or more client devices, of the individual client devices, that successfully created a network connection to the computing system using the first protocol and that did not successfully create a network connection to the computing system using the protocol; and output a notification indicating expected incompatibility of the one or more client devices with the second protocol.

14. The one or more non-transitory computer-readable media of claim 13, wherein the instructions further cause the system to modify a division of the requests based at least in part on a time of day.

15. The one or more non-transitory computer-readable media of claim 13, wherein the instructions further cause the system to detect that data of the first set of endpoints contains insufficient data and to modify division of the requests to increase a proportion of subsequent requests that are directed to the first set of endpoints.

16. The one or more non-transitory computer-readable media of claim 13, wherein the instructions further cause the system to redirect additional requests from the one or more client devices to a third set of endpoints implementing the first protocol and configured to generate data that includes additional information regarding connection attempts by the one or more client devices relative to the data of the first set of endpoints and the data of the second set of endpoints.

17. The one or more non-transitory computer-readable media of claim 13, wherein the second protocol is a different version of the first protocol.

18. The one or more non-transitory computer-readable media of claim 13, wherein the first protocol and the second protocol are cryptographic protocols.

19. The one or more non-transitory computer-readable media of claim 13, wherein the instructions cause the computing system to divide the requests among the at least two sets of endpoints using internet protocol (IP) load balancing.

20. The one or more non-transitory computer-readable media of claim 13, wherein comparing the data of the first set of endpoints with the data of the second set of endpoints to identify one or more client devices comprises detecting that a successful connection rate of individual client devices reflected within the data of the first set of endpoints exceeds a successful connection rate of individual client devices reflected within the data of the second set of endpoints by at least a threshold amount.

21. The one or more non-transitory computer-readable media of claim 13, wherein the one or more client devices correspond to a class of client devices identified based at least partly on parameters presented by the one or more client devices within the requests to initiate connections with the computing system.

* * * * *

UNITED STATES PATENT AND TRADEMARK OFFICE
CERTIFICATE OF CORRECTION

| | | |
|---|---|---|
| PATENT NO. | : 12,316,673 B1 | Page 1 of 1 |
| APPLICATION NO. | : 18/067601 | |
| DATED | : May 27, 2025 | |
| INVENTOR(S) | : Saalfeld et al. | |

It is certified that error appears in the above-identified patent and that said Letters Patent is hereby corrected as shown below:

In the Drawings

Sheet 2 of 5, Fig. 2, Ref 116, Line 1, delete "INCOMPATABILITY" and insert
-- INCOMPATIBILITY --.

Sheet 4 of 5, Fig. 4, and on the title page, the illustrative print figure, Ref 412, Line 3, delete "ADDIITIONAL DATA" and insert -- ADDITIONAL DATA --.

In the Claims

Column 21, Line 24, Claim 8, delete "more computing processors" and insert -- more processors --.

Signed and Sealed this
Sixth Day of January, 2026

John A. Squires
*Director of the United States Patent and Trademark Office*